United States Patent
Scholl et al.

(10) Patent No.: US 7,637,974 B2
(45) Date of Patent: Dec. 29, 2009

(54) ACTIVE CARBON COATED FILTER ELEMENT FOR PREVENTING THE LEAKING OF HYDROCARBONS

(75) Inventors: Hans-Peter Scholl, Mundelsheim (DE); Guenther Scholz, Stuttgart (DE); Heinz Daubner, Sachsenheim (DE); Johann Rackerseder, Aham (DE); Reinhold Lebherz, Mundelsheim (DE); Frank Pfeiffer, Moensheim (DE); Jens Sohnemann, Landshut (DE); Juergen Stahl, Ludwigsburg (DE); Fritz Brenneis, Frontenhausen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 437 days.

(21) Appl. No.: 11/271,987

(22) Filed: Nov. 14, 2005

(65) Prior Publication Data

US 2006/0108278 A1    May 25, 2006

(30) Foreign Application Priority Data

Nov. 13, 2004    (DE)    ........................ 10 2004 054 970

(51) Int. Cl.
*B01D 50/00*    (2006.01)
(52) U.S. Cl. ........................ 55/340; 55/385.3; 55/502; 123/198 E
(58) Field of Classification Search ................... 55/340, 55/385.3, 481, 492, 493, 502, 506, 478, 490; 123/198 E
See application file for complete search history.

(56) References Cited

U.S. PATENT DOCUMENTS

| 429,630 | A | * | 6/1890 | Nakamura et al. | ............ 292/67 |
| 5,125,941 | A | | 6/1992 | Ernst et al. | |
| 6,598,580 | B2 | * | 7/2003 | Baumann et al. | ......... 123/198 E |
| 2002/0029549 | A1 | | 3/2002 | Baumann et al. | |

FOREIGN PATENT DOCUMENTS

| DE | 3902546 | 8/1990 |
| DE | 10063789 A | 6/2002 |
| DE | 10249110 | 4/2004 |
| WO | WO 0050149 | 8/2000 |

OTHER PUBLICATIONS

European Search Report dated Dec. 22, 2005.

* cited by examiner

*Primary Examiner*—Jason M Greene
*Assistant Examiner*—Karla Hawkins
(74) *Attorney, Agent, or Firm*—Crowell & Moring LLP

(57) ABSTRACT

An active carbon coated filter element is proposed for preventing the issuance of hydrocarbons from an opening. It includes a medium containing active carbon, which is of substantially planar shape and has a frame. The frame is provided with sealing lips on at least two sides. The medium is arranged with the frame in a plastic holder, the plastic holder being able to be inserted and fixed in the opening. The sealing lips engage the wall of the opening.

18 Claims, 4 Drawing Sheets

ACTIVE CARBON COATED FILTER ELEMENT FOR PREVENTING THE LEAKING OF HYDROCARBONS

This application claims priority to German Application No. 10 2004 054 970.2, filed Nov. 13, 2004, the entire disclosure of which is incorporated herein by reference.

FIELD OF THE INVENTION

The present invention relates to an active carbon coated filter element and to such a filter element for an internal combustion engine.

BACKGROUND OF THE INVENTION

An important goal in the development of modern internal combustion engines is a reduction of pollutant emission. A purpose of development activities is an optimization of exhaust cleaning systems. Modern exhaust cleaning systems currently achieve pollutant conversion rates of over 97%.

Increasing atmospheric pollution in nearly all countries has led to increasingly stringent limitation on pollutant emission. To assure repeatability and comparability, various testing methods, evaluations and limits have been considered. For example, in regard to limits in the USA, there is the category ULEV (Ultra Low Emission Vehicle) and the category with the strictest limits at this time of SULEV (Super Ultra Low Emission Vehicle).

For cleaning the air needed for combustion in the internal combustion engines, air filter systems are known, especially filter elements for the air entering at the front-end. These filters are for example wound with filter layers which are alternately flat and corrugated in shape. Thus passages are formed which by an alternating blockage force the flow through the filter medium. Thus the medium being filtered passes through passages open at the front end on the entry end of the filter and alternates within the filter element in passages which are open at the exit end and are adjacent to the entry passages. Thus a filtration of the fluid takes place.

For example, DE 10063789A discloses a filter element for entry at the front end, which has triangular passages that are closed alternately such that, by flowing from an entry end to an exit end, the fluid to be filtered must pass through the filter material. The passages are formed by the alternate application of flat layers and folded layers, in which all ends of the inflow passages lead into passages at the outflow end.

In PCT/WO 200050149 a filter element is disclosed having first and second flow ends opposite one another. The filter medium consists of a folded construction in which the folds are divided into an upper and a lower series of passages. The upper row of passages is closed at the outflow end, while the lower row of passages is closed at the entry end.

As a consequence of the above-described SULEV/ULEV problem, it is disadvantageous, however, that due to the lack of materials that are capable of binding hydrocarbons, the hydrocarbons present in the intake tube of an internal combustion engine can enter into the environment.

It is therefore a problem for the present invention to avoid the described disadvantages of the state of the art and create an active carbon coated filter element which can be arranged in the air intake tract of an internal combustion engine and reliably reduce the emissions of a vehicle.

SUMMARY OF THE INVENTION

An important advantage of the present invention is that the filter element has a medium which is disposed in a plastic supporting frame. This plastic supporting frame can be inserted and fixed in an opening at the clean air end, while the frame enveloping the medium has at least two sealing lips and these sealing lips lie on the wall of the opening.

Another important advantage of the invention is that the medium is irremovable and secured against manipulation on account of the plastic holder and a direct seal by the sealing lips between the medium and the wall of the opening.

According to an embodiment of the invention the medium can be inserted into the plastic holder. Holding straps arranged on the plastic holder provide that the medium reaches the intended position. The plastic holder itself is fixed in the opening, with vibration welding. On account of the flexibility of the sealing lips, vibration welding into a vibration apparatus is possible which leads only to a shifting of the sealing lips—but not to leakage.

To increase stability, especially in the case of very large-area active carbon coated filter elements, the plastic holder is, according to a further embodiment, provided with a supporting grid. The medium lies on this supporting grid. Even great differential pressures produced due to a high air throughput do not result in a change in the position of the medium.

According to an embodiment of the medium, the medium includes pleated nonwoven material which is doped with active carbon. A U-shaped holding profile is provided to position the sealing lips on the nonwoven material. It bears the sealing lip and is placed over the last fold of the filter medium.

Such a filter element is used chiefly in internal combustion engines in which any outgassing of hydrocarbons from the intake tract is to be effectively prevented. For this purpose the filter medium closes an air intake duct.

BRIEF DESCRIPTION OF THE DRAWINGS

Further details of the invention are described with the aid of the following drawings.

DESCRIPTION OF PREFERRED EMBODIMENTS

Figure 1:
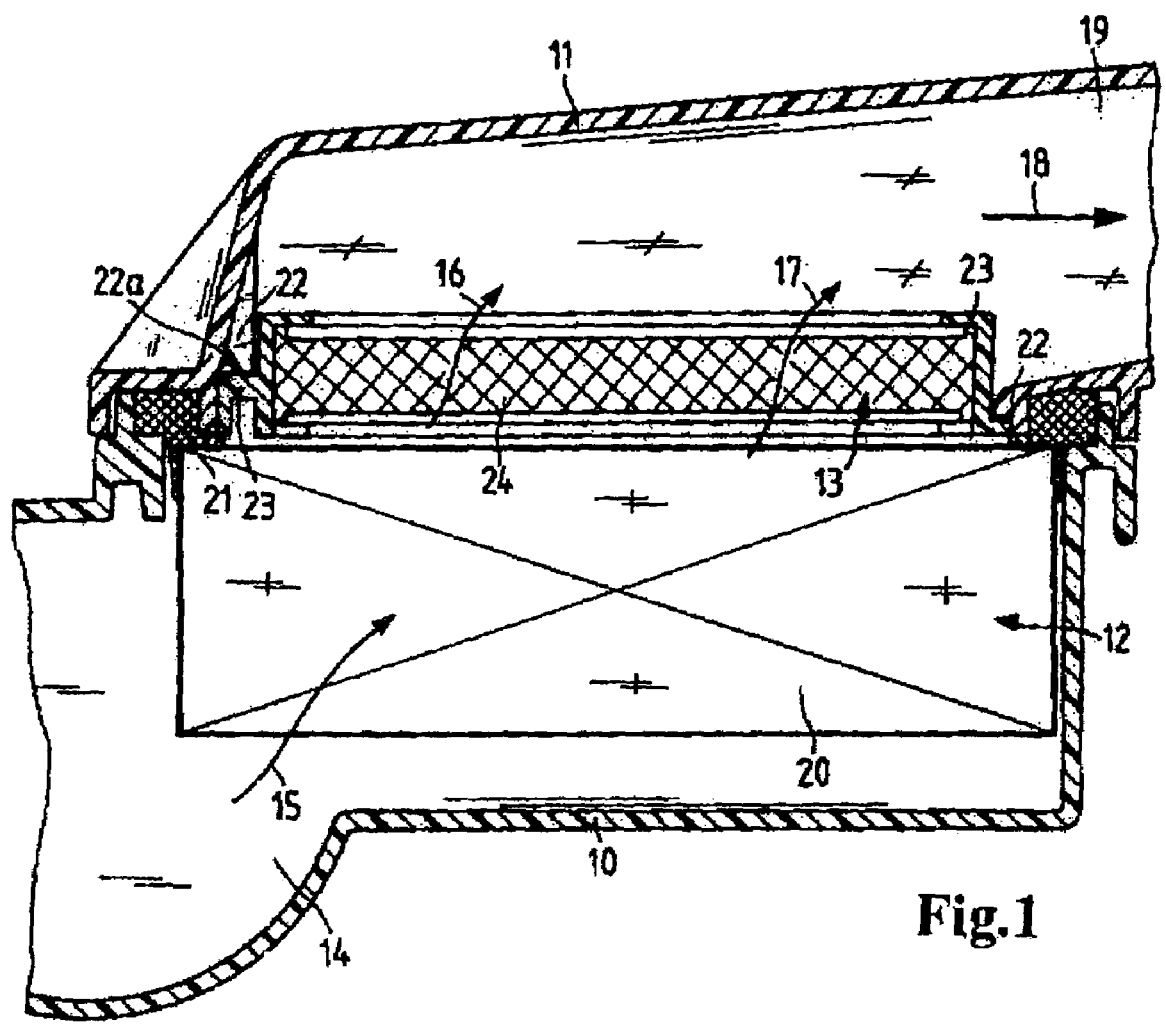
FIG. 1 shows a schematic representation of an active carbon coated filter element in the air intake tract of an internal combustion engine.

FIG. 1 shows an air intake filter system for an internal combustion engine, with a housing bottom 10, a housing top 11, a particle filter 12 arranged between the housing bottom 10 and the housing top 11, and an active carbon coated filter element 13 arranged above the particle filter. The intake air flows—beginning from the air intake opening 14—according to arrow 15 through the particle filter 12 and then according to arrows 16 and 17 through the filter element 13 into the clean air area, and is carried from there according to arrow 18 to the internal combustion engine not here shown. If the internal combustion engine is not in operation, fuel vapors enter into the clean air chamber 19, and without an active carbon coated filter element 13 they can pass through the particle filter 12 to the air intake opening 14 and thus into the environment. This, however, is effectively prevented by the filter element 13. The active carbon takes up hydrocarbons which might occur, and adsorbs them. When the internal combustion engine starts, the hydrocarbons desorb from the adsorber and are carried away with the intake air, and thus the filter element 13 becomes again absorptive for later use. The particle filter 12 is a pleated element 20 which is plate-shaped and has a circumferential PUR gasket. This gasket is clamped between the housing bottom 10 and housing top 11. The housing top 11 is provided with a receiver 22 and with an edge on which a plastic holder 23 is placed and can be welded to the receiver 22. In the plastic holder the medium 24 containing the active carbon is arranged. In the example here shown, this medium 24 is a foam pad into which active carbon is doped.

Figure 2:
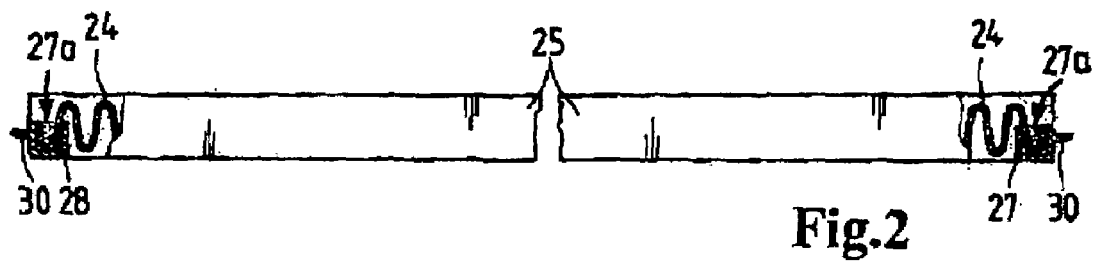
FIG. 2 is a plan view of a filter element.
Figure 2A:
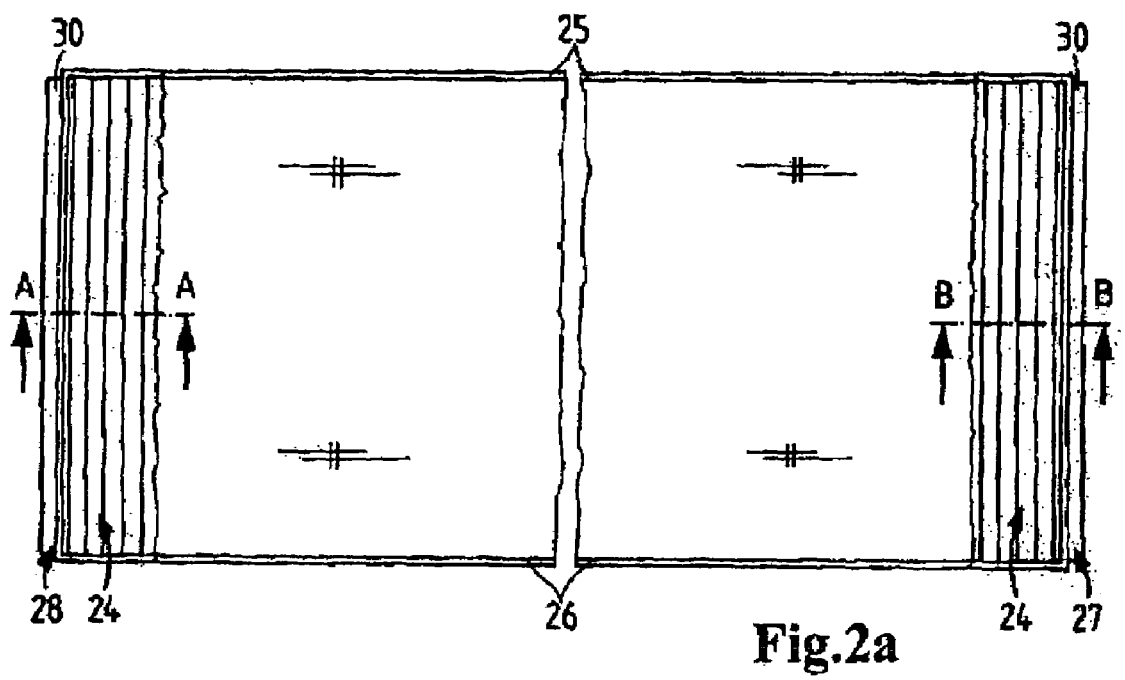

According to FIG. 2 the medium 24 can also be a pleated nonwoven material bearing the active carbon.

The medium 24 shown in FIG. 2 is surrounded by a facing band 25, 26. The bonding together of the facing band 25, 26 is appropriately performed by cementing the edges, so that a seal is formed between the upper and lower sides. At the narrow sides there is in each case a sealing profile 27, 28, which is shown in enlarged cross section in FIG. 3. The medium 24 terminates at an arch 29. The sealing profile 27 includes a U-shaped holding rim which at least partially wraps around the arch 29 or end fold of the filter fluff. The sealing lip 30 on the U-shaped holding rim is elasticized. An elastomer can be used here, which is joined by the two-component injection molding process to the U-shaped holding rim.

There is of course the possibility of providing an elastic sealing lip, in the case of a single-component material, by using a particular plastic material and giving it such a geometrical shape.

Figure 3:
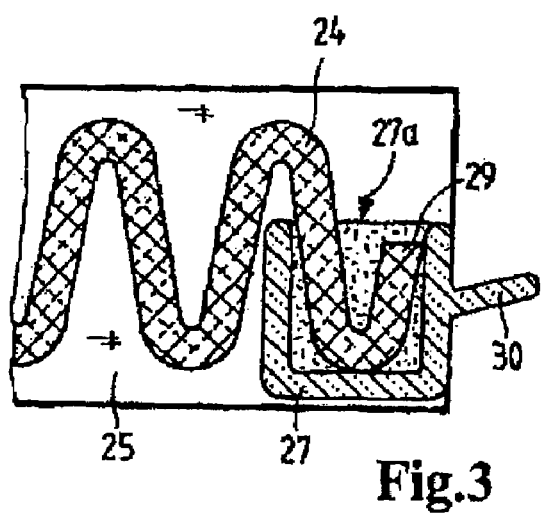
FIG. 3 is a detail view of a sealing lip on a pleated filter element.
Figure 4:
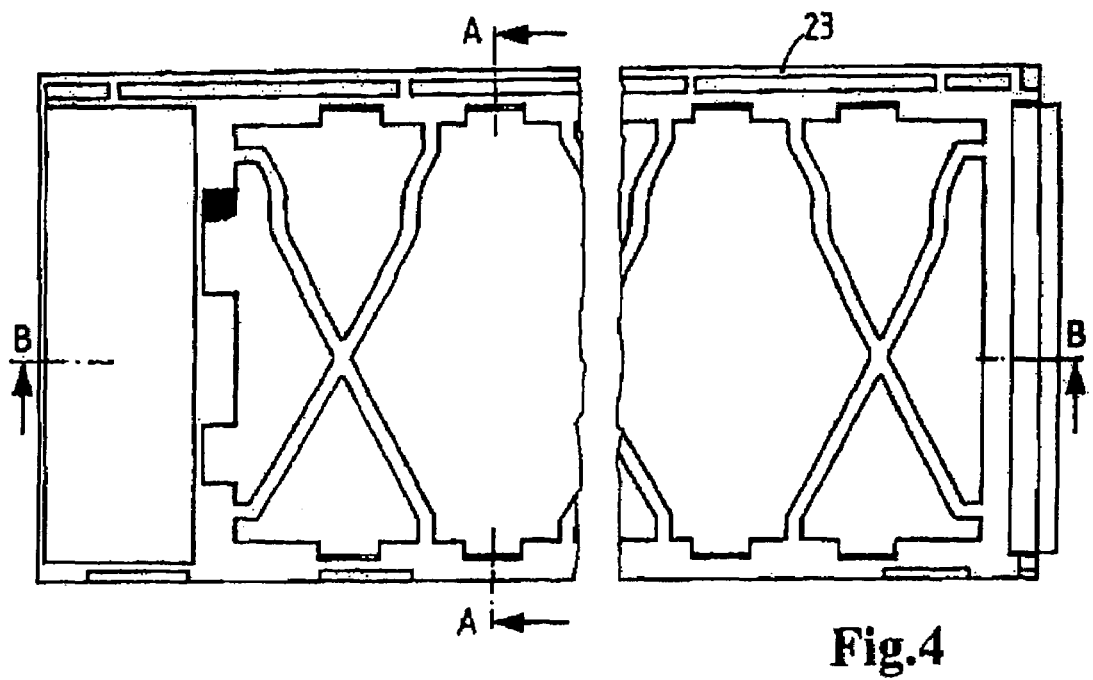
FIG. 4 shows a plastic holder in a top plan view.
Figure 4A:
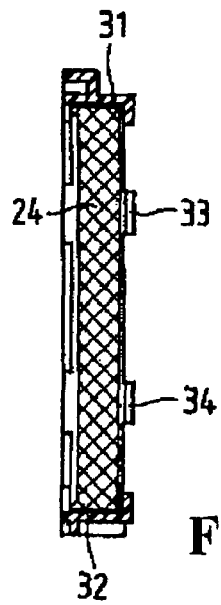

The ready-made medium 24 shown in FIGS. 2 and 3 is inserted into a plastic holder represented in FIG. 4. The plastic holder is open on the right side and has—as shown in FIG. 4a—side angles 31, 32, which position the medium 24. Underneath the medium 24 are support grids or support members 33, 34. On the top side the medium 24 is—as shown in FIG. 4—open.

Figure 5:
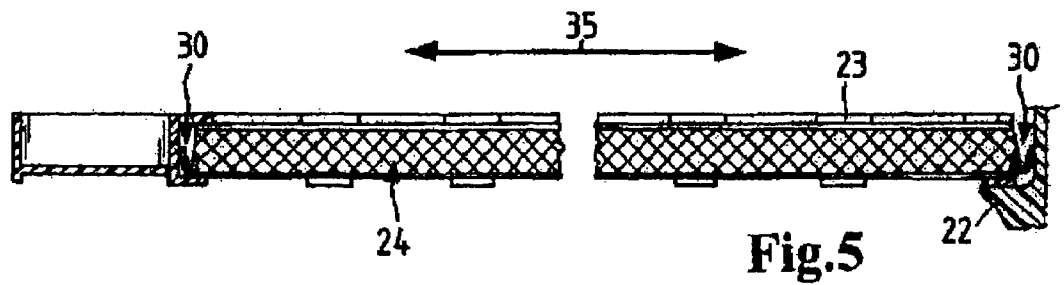
FIG. 5 shows a plastic holder with filter element inserted.

FIG. 5 shows the plastic holder 23 which lies in the receiver 22, which is represented only schematically in this case. The medium 24 lies with the sealing lip 30 at the receiver 22 and the wall of the through-opening. In the welding process the plastic holder moves slightly in the lengthwise direction according to arrow 35. This movement can easily be accommodated by the sealing lip. Also the final position of the plastic holder, defined by the welding, results in a reliable sealing at the narrow ends on account of the elasticity of the sealing lip 30.

Figure 6:
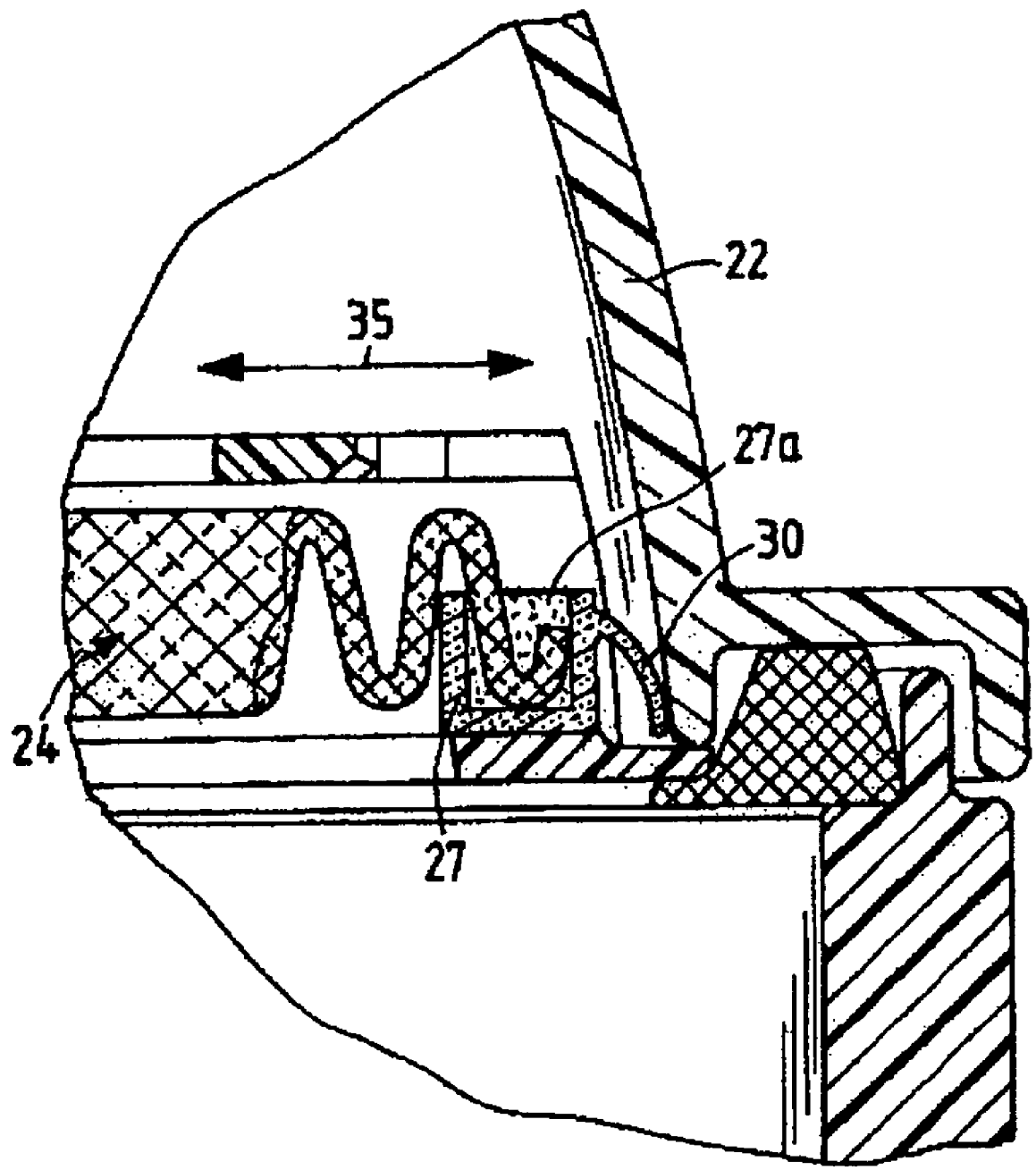
FIG. 6 is a detailed view of the seal.

In FIG. 6 there is shown in detail the seal between the receiver 22 and the medium 24. The long sides are sealed by the welded junction between the plastic holder and the receiver 22.

What is claimed:

1. An active carbon coated filter element for preventing leaking of hydrocarbons from an opening, comprising a medium containing active carbon, which has an substantially flat shape and has a frame, the frame including facing bands on opposite sides of the medium and U-shaped holding profiles on opposite ends of the medium, and said U-shaped holding profiles being formed with sealing lips on at least two sides of the frame, wherein the medium is disposed with the frame in a plastic holder, wherein the plastic holder is insertable into the opening and affixed, with the sealing lips lying against a wall of the opening, wherein each U-shaped holding profile is at least partially wrapped around a respective end fold of the medium to position the sealing lips formed on the holding profiles relative to the medium.

2. The active carbon coated filter element according to claim 1, wherein the medium is insertable into the plastic holder and the plastic holder has holding tabs for a fixation of the medium.

3. The active carbon coated filter element according to claim 1, wherein the plastic holder is fixed in the opening by vibration welding.

4. The active carbon coated filter element according to claim 3, wherein the vibration welding surfaces are arranged running at right angles to the sealing lips.

5. The active carbon coated filter element according to claim 4, wherein the plastic holder has a flat supporting grid at least at one side.

6. The active carbon coated filter element according to claim 3, wherein the plastic holder has a flat supporting grid at least at one side.

7. The active carbon coated filter element according to claim 2, wherein the plastic holder has a flat supporting grid at least at one side.

8. The active carbon coated filter element according to claim 1, wherein the plastic holder has a flat supporting grid at least at one side.

9. The active carbon coated filter element according to claim 8, wherein the medium is of a pleated shape and includes a nonwoven material.

10. The active carbon coated filter element according to claim 7, wherein the medium is of a pleated shape and includes a nonwoven material.

11. The active carbon coated filter element according to claim 6, wherein the medium is of a pleated shape and includes a nonwoven material.

12. The active carbon coated filter element according to claim 5, wherein the medium is of a pleated shape and includes a nonwoven material.

13. The active carbon coated filter element according to claim 4, wherein the medium is of a pleated shape and includes a nonwoven material.

14. The active carbon coated filter element according to claim 3, wherein the medium is of a pleated shape and includes a nonwoven material.

15. The active carbon coated filter element according to claim 2, wherein the medium is of a pleated shape and includes a nonwoven material.

16. The active carbon coated filter element according to claim 1, wherein the medium is of a pleated shape and includes a nonwoven material.

17. A method for installing an active carbon coated filter element according to claim 1, comprising:
    preparing a medium of a flat shape, the medium containing active carbon and having a frame and sealing lips,
    inserting the medium into a plastic holder, and
    inserting the plastic holder into a correspondingly hollowed opening, the plastic holder being fixed by vibration welding so that the sealing lips lie against a wall of the opening.

18. Use of an active carbon coated filter element according to claim 1 in the air intake tract of an internal combustion engine, wherein the active carbon adsorbs hydrocarbons from the air intake tract.

* * * * *

UNITED STATES PATENT AND TRADEMARK OFFICE
CERTIFICATE OF CORRECTION

PATENT NO. : 7,637,974 B2  Page 1 of 1
APPLICATION NO. : 11/271987
DATED : December 29, 2009
INVENTOR(S) : Scholl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 670 days.

Signed and Sealed this

Ninth Day of November, 2010

David J. Kappos
*Director of the United States Patent and Trademark Office*